Jan. 20, 1959 H. F. JURGELEIT 2,869,177
GUIDES FOR RECIPROCABLE PLATENS
Filed Aug. 10, 1955 2 Sheets-Sheet 2
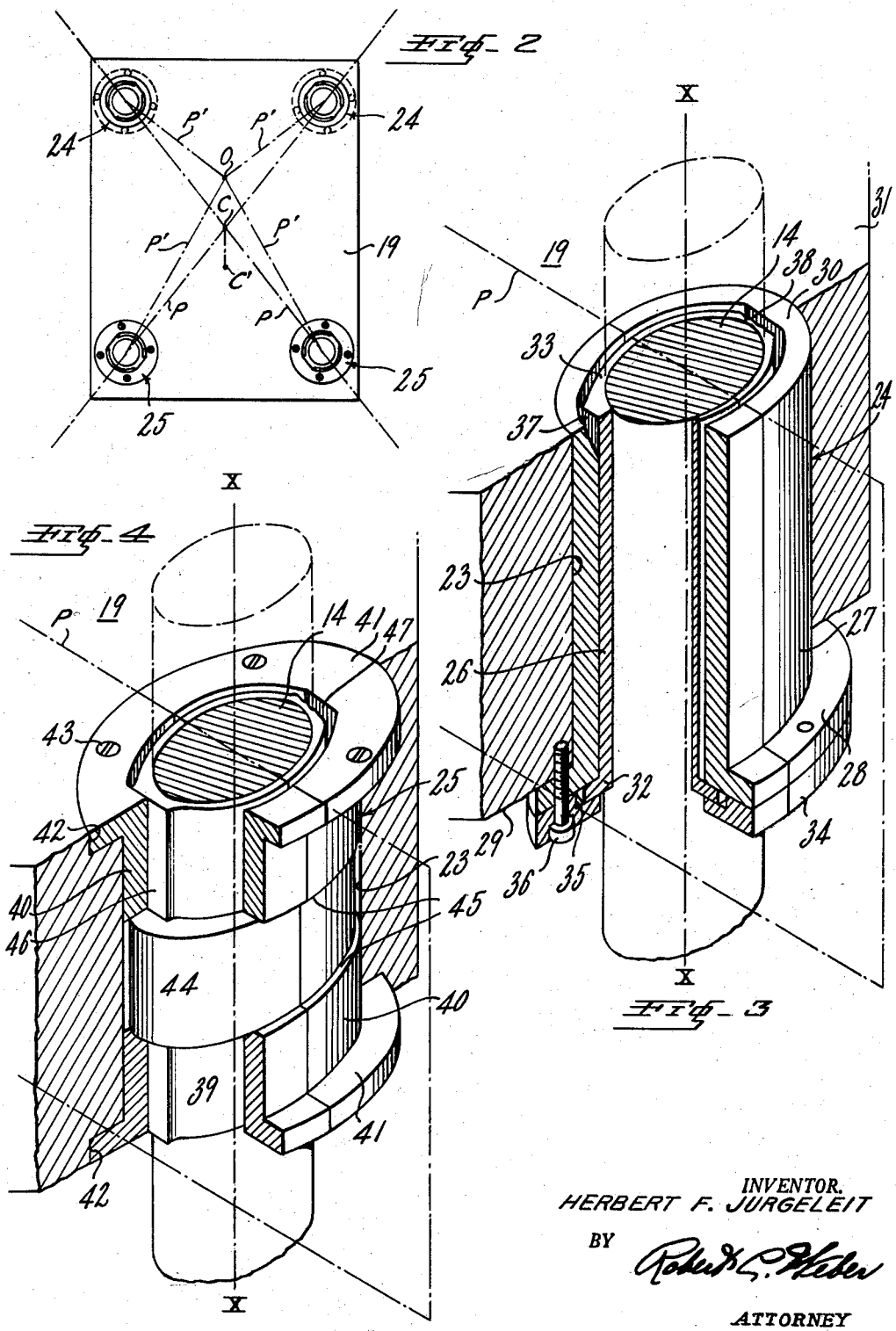
INVENTOR.
HERBERT F. JURGELEIT
BY
ATTORNEY

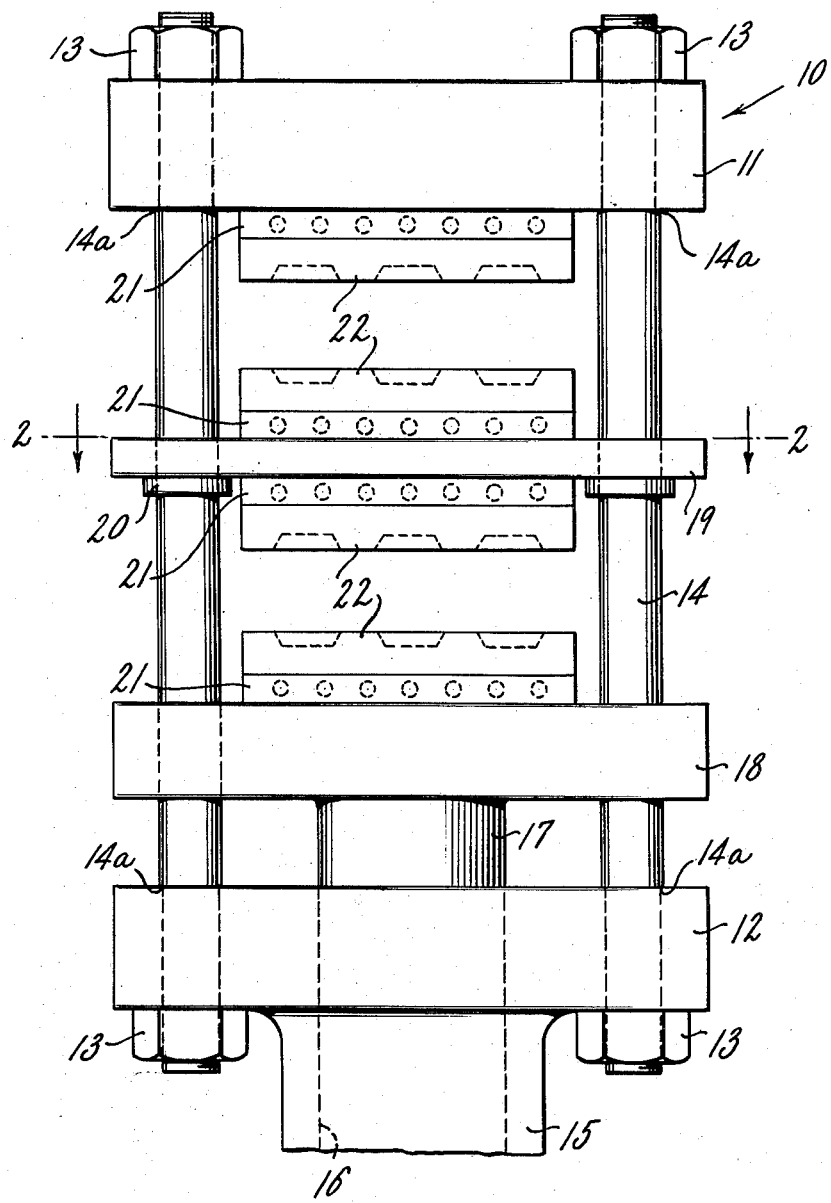

United States Patent Office 2,869,177
Patented Jan. 20, 1959

2,869,177

GUIDES FOR RECIPROCABLE PLATENS

Herbert F. Jurgeleit, Oceanside, N. Y., assignor to United States Rubber Company, New York, N. Y., a corporation of New Jersey Application August 10, 1955, Serial No. 527,583

12 Claims. (Cl. 18—17)

This invention relates to mechanisms, such as presses adapted for the molding of various plastic materials under heat and pressure into the desired commercial shapes, and more particularly to improved guide means to accurately and automatically compensate for the thermal expansion and contraction of elements in mechanisms, such as a reciprocable press platen.

In the conventional practice of molding such materials, it is customary to employ a hydraulic press for applying pressure to cause the plastic mass to flow into and conform to the shape of the mold cavities and also to maintain pressure upon the molds while the plastic material sets to the desired shape. Temperatures of 350° F. or more are common and the material, depending upon its particular characteristics, is either heated or cooled to cause it to set. As may be expected, these wide temperature variations are transmitted in a great measure to the press platens and thus, some provision must be made for the thermal expansion and contraction thereof.

Such provision was heretofore made in the case of presses with cylindrical columns by interposing full circle guides between the columns and the reciprocable platens. Unfortunately, it was necessary to provide excess clearance or looseness between the guides and columns, or to attach the ends of the columns loosely to the fixed upper and lower crossheads so that the columns could shift or "walk" laterally. As will be seen these practices defeated the purpose of the guides to a great extent.

For example, if excess clearance were provided between the columns and the guides which were attached to a platen, there would be little or no binding between the guides and columns when the platen was hot, but when the platen was at a relatively low temperature and in a substantially contracted condition, it would rotate in a horizontal plane, shift laterally in almost any direction and could also tilt when unequally loaded. On the other hand, the use of loose or walking columns precluded the prestressing of the ends of the columns. Prestressing of the column ends is a definite initial tightening of the column nuts sufficient to prevent any separating of the crossheads from the column shoulders when the full ram load is applied, and is a feature which is still considered essential for proper alignment of the press and mold members, as well as low maintenance costs.

As a result, the molding industry was substantially restricted to the production of goods where the inaccuracies inherent in the operation of such presses were of little or no consequence with reference to the particular article produced. There are, however, many products which require precision in their proper production and which cannot be satisfactorily molded in these prior art presses.

Therefore, the principal object of the present invention is to provide improved guide means for reciprocable platens, such as in molding presses, to accurately and automatically compensate for the thermal expansion and contraction of such platens without binding between the guides and press columns, while restricting the platens against undesirable tilting, lateral shifting and horizontal rotation.

Another object is to provide such guides which are so constructed that the press columns may be prestressed for proper alignment of the press and mold members, as well as for low maintenance costs.

A further object is to provide such guides which may be easily and economically replaced when worn.

Other objects and advantages of the invention will become apparent upon a consideration of the following specification and claims when read in conjunction with the accompanying drawings wherein:

Fig. 1 is an elevational view of a typical molding press in which the guides comprising the present invention may be incorporated;

Fig. 2 is a view taken substantially along line 2—2 of Fig. 1, but slightly reduced in scale, and illustrates a typical press platen slidably mounted on columns with two different types of guides interposed therebetween, each embodying the principles of the invention;

Fig. 3 is an enlarged isometric view with parts broken away in section to illustrate one type of guide adapted to the platen of Fig. 2, and Fig. 4 is a view similar to Fig. 3 but illustrates another type of guide.

Referring to Fig. 1, there is shown a typical plastic molding press 10 comprising an upper crosshead 11 and a lower crosshead 12 rigidly secured together by means of nuts 13 and columns 14. The columns 14 are provided with shoulders 14a which properly space crossheads 11 and 12, and serve as abutments whereby the ends of the columns 14 may be prestressed by tightening nuts 13. This prevents any separation of the crossheads 11, 12 from the shoulders 14a when the press 10 is under full ram load, resulting in reduction of maintenance costs and proper alignment of the various press parts, particularly the mold members. The lower crosshead 12 and extension 15 thereon form a cylinder 16 in which the ram 17 reciprocates. A lower platen or ram cap 18 is rigidly secured to ram 17 for reciprocation therewith and is slidably mounted over columns 14. An intermediate platen 19 is likewise slidably mounted over columns 14, its lowermost position being determined by the collars 20 on columns 14. As will be apparent, platens 18 and 19, as well as upper crosshead 11 are provided with the usual steam heated plates 21 and mold cavity plates 22.

In operation, the ram 17 forces platens 18 and 19 upwardly and the mold plates 22 together to mold the plastic material in a manner well-known to those skilled in the art. However, for proper press operation it is necessary that ram cap 18 and platen 19 be freely slidable along columns 14; thus, full circle or 360° guides are employed. The use of such guides, however, presents a problem in the thermal expansion and contraction of these movable members 18 and 19. It has been observed that the rigid upper and lower crossheads 11 and 12 are in general at a lower temperature than platens 18 and 19, and that a temperature differential often occurs between ram cap 18 and intermediate platen 19. Obviously, if the guides between platens 18, 19 and the columns 14 fit too tightly, the press 10 will be inoperable because of the binding of the guides on the columns.

As stated previously, the current practice of providing excess clearance or looseness between the guides on the movable members and the columns to allow for thermal expansion or contraction, or of attaching the ends of the columns loosely to the upper and lower crossheads so that the columns can shift or "walk" laterally, defeats the purpose of the guides to a large extent. As a consequence, there is no assurance that the cavities in mold plates 22 will register accurately. In addition, the use of loose or "walking" columns precludes prestressing the ends of the columns, a feature which is essential for proper alignment of the press and mold members and low maintenance costs. As will be seen shortly, the practice of the present invention eliminates these difficulties without in any way interfering with the free movement of platens 18 and 19 along columns 14.

Even though platens 18 and 19 may be uniformly heated or cooled for uniform thermal expansion and contraction in themselves, it has been observed that they may expand or contract unequally with respect to each other, as well as with respect to upper and lower crossheads 11 and 12. Nevertheless, it has been observed that the resultant thermal expansion and contraction of these platens relative to columns 14 occurs in certain directions. These observations were made on a press such as 10, which was equipped with conventional guides between platens 18, 19 and columns 14, and wherein excess clearance was provided between the guides and columns. As a result of these observations, it was confirmed that the resultant movements of the guides (which were merely 360° bushings mounted in the platens) relative to their respective columns during thermal expansions and contraction of the platens, were along planes drawn through the axes or centerlines of the diagonally opposite columns and intersecting in the vertical center line or centroid of the platen. Accordingly, it was concluded that if the guides or bushings were permitted to move only in these directions, the thermal expansion and contraction of the platens 18, 19 with respect to each other and to upper and lower crossheads 11, 12, could be compensated for without sacrifice in lateral stability. Thus, the platens 18, 19 would be freely slidable on columns 14, yet would not shift or rotate laterally, nor tilt about their vertical axes.

Referring now to Figs. 2, 3 and 4, it will be shown how these principles of the invention are embodied in two different types of guides. Platen 19 is illustrated as having a plurality of peripherally spaced bores 23 for the reception of columns 14 and guides 24, 25. In the particular embodiment illustrated, platen 19 is rectangular in shape and the diagonal planes P, which intersect in the center line or centroid C of the platen pass through the axes of the columns 14. As stated previously, it is along these planes that the resultant thermal expansion and contraction of platen 19 occurs relative to the columns 14.

For the sake of convenience, reference is made hereinafter to platen 19 only. However, it will be apparent that the guides 24, 25 may be applied to ram cap 18 or any other thermally expansible and contractible element in a mechanism wherein guides are required to adequately compensate for the expansion and contraction of such element. Likewise, for simplicity, platen 19 is shown with two of each of guides 24 and 25, whereas in actual practice one or the other would usually be used exclusively.

Referring now to Fig. 3, guide 24 comprises a pair of concentrically spaced and substantially cylindrical inner and outer members 26 and 27, respectively. The outer member or bushing retainer 27, which is preferably made of cast iron, is provided with a radial flange 28 at one end which seats on the lower surface 29 of platen 19. The retainer 27 slidably and snugly fits within bore 23 of the platen and its upper face 30 is flush with the top surface 31 of the platen. The inner member or bushing 26, which is preferably made of bronze, slidably fits within retainer 27 and also has a flange 32 at one end which partially overlaps flange 28, the upper end 33 of bushing 26 also being flush with surface 31 of the platen 19. The retainer 27 is provided with a collar 34 having an annular slot 35, which in conjunction with flange 28 forms a recess for flange 32 on bushing 26. Flange 32 slidably engages the opposed radial surfaces of flange 28 and slot 35 for permitting relative movement between bushing 26 and retainer 27 in directions perpendicular to the reciprocation of platen 19, but prevents relative movement therebetween in the direction of platen reciprocation.

Retainer 27 is rigidly secured within bore 23 of platen 19 by means of machine screws 36 passing through collar 34 and flange 28, while bushing 26 slidably engages columns 14. However, both bushing 26 and retainer 27 are provided with pairs of diametrically opposed plane surfaces extending substantially the entire length thereof. The exterior surfaces 37 on bushing 26 slidably mate with the interior surfaces 38 on retainer 27 for permitting relative reciprocation between the bushing and retainer in a direction perpendicular to the reciprocable movement of the platen. As will be apparent from Fig. 3, these mating surfaces 37 and 38 are disposed in planes which are substantially parallel to and equidistant from plane P, which passes through the axis X—X of column 14. Thus, the guide retainer 27 and the adjacent portion of platen 19 are permitted to move relative to bushing 26 and column 14 in the direction of plane P, as is required in order to prevent binding on the column due to the resultant thermal expansion and contraction of the platen, which occurs along that plane. Obviously, when a plurality of guides 24 are employed as in Fig. 2, the aforementioned movement at the various columns will occur in the directions of the respective diagonal planes P, which not only pass through the axes X—X of the respective columns 14 but also intersect in the vertical center line or centroid C of platen 19.

Referring now to Fig. 4, another type of guide 25 is shown. Like guide 24, it comprises concentrically spaced and substantially cylindrical, inner and outer members 39, 40. Each of the two outer members or bushing retainers 40 is provided with a radial flange 41 at one end which fits in counterbore 42 in platen 19. The retainers 40 slidably and snugly fit in bore 23 of the platen and are rigidly secured therein by machine screws 43 passing through flanges 41. The bushing 39 slidably fits around column 14 and within retainers 40, and is provided with a peripheral flange 44 intermediate its ends which slidably engages the opposed radial surfaces 45 of the retainers. Thus, relative movement between bushing 39 and retainers 40 can occur in directions perpendicular to the reciprocation of platen 19, but not otherwise.

In order to restrict the direction of relative movement between bushing 39 and retainers 40, each is provided with a pair of diametrically opposed plane surfaces extending longitudinally thereof. The exterior surfaces 46 on bushing 39 slidably mate with the interior surfaces 47 on retainers 40, and these surfaces are disposed in planes which are substantially parallel to and equidistant from plane P passing through the axis X—X of column 14. Thus, the guide retainers 40 and platen 19 are permitted to reciprocate relative to bushing 39 and column 14 only in the direction of plane P to accurately and automatically compensate for the thermal expansion and contraction of the platen 19 occurring along that plane. It will therefore be apparent that when a plurality of guides 25 are employed as in Fig. 2, the aforementioned movement will occur in the directions of diagonal planes P.

For convenience in removing and replacing guides 24 and 25, the bushings and retainers in each are split in half throughout their lengths. In addition, the concentric spacing between the bushings and retainers in each of guides 24 and 25 is sufficient to permit the desired amount of relative movement therebetween without contact other than along their mating plane surfaces 37, 38 and 46, 47, respectively. It will now be evident that guides 24 and 25 provide an effective solution to the problem of thermal expansion and contraction of a reciprocable press platen without sacrificing the optimum desirable guiding function provided by full circle or 360° guides. The ends of columns 14 may be prestressed for greater rigidity, proper alignment of the various press members, particularly the cavities in mold plates 22, and reduced maintenance costs. Moreover, the mating, plane surfaces 37, 38 and 46, 47 which also extend longitudinally of guides 24 and 25 respectively, not only limit the aforementioned relative movement to the desired directions but also prevent the reciprocable platen from shifting laterally or rotating in a horizontal plane. Since the mating, plane surfaces of any one guide are not parallel to those of all the other guides, the guides 24 and 25 will resist tilting of the platen in any direction, even when unequally loaded. Accordingly, the use of guides 24 and 25 permit the molding of precision, quality products and contribute to economical press operation.

In choosing either guide 24 or 25 for a particular application, it will be noted that guide 25 will afford somewhat greater rigidity or stability to a reciprocable platen against tilting in the event of eccentric loading. This is true because, in addition to the resistance to tilting offered by the mating, plane surfaces, the retainers 40 are rigidly secured to both the top and bottom of platen 19 and engage the relatively thick intermediate flange 44 of bushing 39 to strongly resist any eccentric load applied either to the top or bottom of the platen tending to cock or tilt the platen and retainers 40 relative to bushing 39. In contrast, the resistance of guide 24 to such cocking or tilting of the platen depends solely on the stabilizing effect of the plane mating surfaces. Moreover, flange 32 of guide 24, being relatively thin, will bend or break more easily, and there is no restraining structure on the top of the platen to prevent bushing 26 and retainer 27 of guide 24 from telescoping upon bending or breaking of flange 32. On the other hand, guides 25 are considerably more expensive than guides 24 because of the greater number of parts and machining operations required by the former. From observing both types in service, guide 24 has been found to be adequate for ordinary applications, thus the increased cost of guide 25 does not justify its use, except for heavy duty operations.

Referring back to Fig. 2, the centroid or vertical center line C of platen 19 does not change position in relation to the columns 14 as the uniformly heated or cooled platen thermally expands and contracts along planes P. This is particularly important to ensure that the mold plates 22 of Fig. 1 remain in vertical alignment and mate properly for precision molding. Although platen 19 is illustrated as rectangular in shape with four diagonally placed guides 24, 25, it is to be understood that the platen could have any polygonal or arcuate shape, regular or irregular, and any plural number of guides located in almost any desired position thereon, just so long as the plane surfaces 37, 38 or 46, 47 on the guides 24 or 25 respectively, are substantially parallel to their respective direction planes passing through the vertical axes X—X of columns 14 and intersecting in a common line. Moreover, this common line need not be the vertical center line or centroid C of the platen 19 but could be located at other positions. However, if the common line of intersection of planes P is not at the center line C, the latter will shift relative to the columns 14 as platen 19 thermally expands and contracts.

For example, assume that the common line of intersection of planes P' is at O; the mating, plane surfaces 37, 38 and 46, 47 of guides 24 and 25 respectively, are substantially parallel to and equidistant from their respective direction planes P', and the platen 19 is uniformly heated. The resultant thermal expansion and contraction of platen 19 relative to columns 14 is permitted to move only along planes P', and line O remains stationary in respect to columns 14. However, the centroid C (no longer the common line of intersection of planes P') will shift to another position C'. Nevertheless, the platen 19 and guides 24, 25 will not bind on columns 14, but can freely reciprocate thereon during thermal expansion and contraction of the platen 19.

It should be noted that when the common line of intersection of the planes P' passing through axes X—X of columns 14 is other than at the centroid C of the platen 19, there may be, in addition to the described shifting of the centroid C, some loss of stability against tilting of platen 19 in certain directions (but an increase in stability in other directions), because of the orientation of plane surfaces 37, 38 and 46, 47. Therefore, for the vast majority of molding operations, and particularly the molding of precision parts where accurate alignment and stability are required, it is essential that the platen centroid C and common line of intersection of the planes passing through the axes of the columns 14 be coincident. However, for certain engineering applications, the above noted shifting of the centroid C, and change in stability characteristics may not be objectionable; moreover, it may even be advantageous in some applications to orientate the resultant thermal expansion and contraction of a reciprocable element from some point or line other than the centroid of the platen. For example, such off-center orientation would be incorporated in a press having platens of irregular geometric shape with no plane or point of symmetry that could properly be called the center or centroid, or in using large or irregularly shaped molds, which, because of associated equipment and space limitations, could not be located at the center of the press platen.

In the foregoing description of the guides 24, 25, it was stated that the plane surfaces 37, 38 and 46, 47 were parallel or substantially parallel to planes P or P'. To be theoretically correct and to compensate for thermal expansion and contraction effects within the guides themselves, the mating plane surfaces of each guide would not be exactly parallel but would pass through the common line of intersection C of planes P, or O of planes P'. The effects of this refinement would be so small for most practical applications that the extra machining costs involved would not ordinarily be justified; however, the exceptional cases where this refinement may be incorporated are contemplated by this invention.

While the invention has been described and illustrated in certain preferred embodiments as applied to a conventional type, hot platen, plastic molding press, it is to be understood that the invention is not limited to this application alone but may readily be used in other mechanisms such as machines or presses operating at elevated or reduced temperatures wherein a thermally expansible and contractible element such as a reciprocable platen must be guided on the frame of the machine. Examples of such mechanisms are horizontal and vertical injection molding presses or machines for the molding of various plastic materials, extrusion presses, machines for hot or cold working of metallic or non-metallic materials, and the like. It is also to be understood that various changes and modifications may be made in the aforementioned embodiments by those skilled in the art without departing from the principles of the invention, the scope of which is to be determined by the appended claims.

Having thus described my invention, what I claim and desire to protect by Letters Patent is:

1. In a mechanism, a thermally expansible and contractible element having a bore extending therethrough, a column extending through said bore, a guide interposed between said column and said element, said guide comprising spaced inner and outer means having portions slidably engageable with each other to prevent relative movement therebetween substantially in the direction of the axis of said column, said outer means being rigidly secured in said bore, and said inner means engaging said column, and each of said inner and outer means having perimetrically spaced, mating plane surfaces for permitting relative movement therebetween in a direction substantially perpendicular to the axis of said column, to accurately and automatically compensate for the thermal expansion and contraction of said element occurring in said perpendicular direction relative to said column.

2. In a mechanism, a thermally expansible and contractible, movable element having a bore extending therethrough substantially in the direction of movement thereof, a column extending through said bore, a guide interposed between said column and said element, said guide comprising substantially arcuate and concentrically spaced, inner and outer means having portions slidably engageable with each other to prevent relative movement therebetween substantially in the direction of movement of the element, the outer arcuate means being rigidly secured in said bore and the inner arcuate means slidably engaging said column, and each of said arcuate means having circumferentially spaced, mating plane surfaces for permitting relative movement therebetween in a direction substantially perpendicular to the movement of the element, to accurately and automatically compensate for the thermal expansion and contraction of said element occurring in said perpendicular direction relative to said column.

3. In a mechanism, a thermally expansible and contractible, reciprocable element having a bore extending therethrough substantially in the direction of reciprocation thereof, a column extending through said bore, a guide interposed between said column and said element, said guide comprising substantially annular and concentrically spaced, inner and outer means having radially extending portions slidably engageable with each other to prevent relative movement therebetween substantially in the direction of reciprocation of the element, the outer annular means being rigidly secured in said bore, and the inner annular means slidably engaging said column, and each of said annular means having diametrically opposed, mating plane surfaces for permitting relative movement therebetween in a direction substantially perpendicular to the reciprocation of the element, to accurately and automatically compensate for the thermal expansion and contraction of said element occurring in said perpendicular direction relative to said column.

4. In a mechanism, a thermally expansible and contractible, reciprocable element having a bore extending therethrough substantially in the direction of reciprocation thereof, a column extending through said bore, a guide interposed between said column and said element, said guide comprising substantially cylindrical and concentrically spaced inner and outer means, one of said cylindrical means having at least one radially extending peripheral flange, and the other of said cylindrical means having at least one radially extending surface slidably engageable with said flange to prevent relative movement therebetween substantially in the direction of reciprocation of the element, the outer cylindrical means being rigidly secured in said bore, and the inner cylindrical means slidably engaging said column, and each of said cylindrical means having diametrically opposed, mating plane surfaces extending longitudinally thereof for permitting relative movement therebetween in a direction substantially perpendicular to the reciprocation of the element, to accurately and automatically compensate for the thermal expansion and contraction of said element occurring in said perpendicular direction relative to said column.

5. In a mechanism, a thermally expansible and contractible, reciprocable element having a bore extending therethrough substantially in the direction of reciprocation thereof, a column extending through said bore, a guide interposed between said column and said element, said guide comprising substantially cylindrical and concentrically spaced, inner and outer means, one of said cylindrical means having at least one radially extending, peripheral end flange, and the other of said cylindrical means having at least one radially extending surface slidably engageable with said flange to prevent relative movement therebetween substantially in the direction of reciprocation of the element, the outer cylindrical means being rigidly secured in said bore, and the inner cylindrical means slidably engaging said column, and each of said cylindrical means having diametrically opposed pairs of mating, plane surfaces extending longitudinally thereof for permitting relative reciprocation therebetween in a direction substantially perpendicular to the reciprocation of the element, to accurately and automatically compensate for the thermal expansion and contraction of said element occurring in said perpendicular direction relative to said column.

6. In a mechanism, a thermally expansible and contractible, reciprocable element having a bore extending therethrough substantially in the direction of reciprocation thereof, a column extending through said bore, a guide interposed between said column and said element, said guide comprising substantially cylindrical and concentrically spaced, inner and outer means, one of said cylindrical means having at least one radially extending, peripheral flange intermediate each end, and the other of said cylindrical means having at least two radially extending surfaces slidably engageable with said flange to prevent relative movement therebetween substantially in the direction of reciprocation of the element, the outer cylindrical means being rigidly secured in said bore and the inner cylindrical means slidably engaging said column, and each of said cylindrical means having diametrically opposed pairs of mating plane surfaces extending longitudinally thereof for permitting relative reciprocation therebetween in a direction substantially perpendicular to the reciprocation of the element, to accurately and automatically compensate for the thermal expansion and contraction of said element occurring in said perpendicular direction relative to said column.

7. In a mechanism, a thermally expansible and contractible element having bores extending therethrough, columns extending through said bores, and guides interposed between said columns and element, said guides comprising spaced inner and outer means having portions slidably engageable with each other to prevent relative movement therebetween substantially in the direction of the axes of said columns, said outer means being rigidly secured in said bores and said inner means engaging said columns, and each of said inner and outer means having perimetrically spaced, mating plane surfaces for permitting relative movement therebetween in directions substantially perpendicular to the axes of said columns to accurately and automatically compensate for the thermal expansion and contraction of said element occurring in said perpendicular directions relative to said columns.

8. In a mechanism, a thermally expansible and contractible, movable element having peripheral bores extending therethrough substantially in the direction of the movement thereof, columns extending through said bores, guides interposed between said columns and element, said guides comprising substantially arcuate and concentrically spaced, inner and outer means having portions slidably engageable with each other to prevent relative movement therebetween substantially in the direction of movement of the element, the outer arcuate means being rigidly secured in said bores and the inner arcuate means slidably engaging said columns, and each of said arcuate means having circumferentially spaced, mating surfaces for permitting relative movement therebetween in directions substantially perpendicular to the movement of the element, said mating surfaces being disposed in planes substantially parallel to planes passing through the axes of said columns to accurately and automatically compensate for the thermal expansion and contraction of the element occurring along the latter planes relative to said columns.

9. In a press, a thermally expansible and contractible, movable platen having a plurality of peripherally spaced bores extending therethrough substantially in the direction of movement thereof, a plurality of cylindrical columns extending through said bores, and guides interposed between said columns and platen, said guides comprising substantially annular and concentrically spaced, inner and outer means having radially extending portions slidably engageable with each other to prevent relative movement therebetween substantially in the direction of the movement of the platen, the outer annular means being rigidly secured in said bores and the inner annular means slidably engaging said columns, and each of said annular means having diametrically opposed, mating surfaces for permitting relative movement therebetween in directions substantially perpendicular to the movement of the platen, said mating surfaces being disposed in planes substantially parallel to and equidistant from planes passing through the axes of said columns to accurately and automatically compensate for the thermal expansion and contraction of the platen occurring along the latter planes relative to said columns.

10. In a press, a thermally expansible and contractible, reciprocable platen having a plurality of peripherally spaced bores extending therethrough substantially in the direction of reciprocation thereof, a plurality of cylindrical columns extending through said bores, and guides interposed between said columns and platen, said guides comprising substantially cylindrical and concentrically spaced, inner and outer means, one of said cylindrical means having at least one radially extending, peripheral flange, and the other of said cylindrical means having at least one radially extending surface slidably engageable with said flange to prevent relative movement therebetween substantially in the direction of reciprocation of the platen, the outer cylindrical means being rigidly secured in said bores and the inner cylindrical means slidably engaging said columns, and each of said cylindrical means having diametrically opposed, mating surfaces extending longitudinally thereof for permitting relative reciprocation therebetween in directions substantially perpendicular to the reciprocation of the platen, said mating surfaces being disposed in planes substantially parallel to and equidistant from planes passing through the axes of said columns and intersecting in a common line to accurately and automatically compensate for the resultant thermal expansion and contraction of the platen occurring along said intersecting planes relative to said columns.

11. In a press, a thermally expansible and contractible, reciprocable platen having peripherally spaced bores extending therethrough substantially in the direction of reciprocation thereof, a plurality of cylindrical columns extending through said bores, and guides interposed between said columns and platen, said guides comprising substantially cylindrical and concentrically spaced, inner and outer means, one of said cylindrical means having at least one radially extending peripheral end flange, the other of said cylindrical means having at least one radially extending surface slidably engageable with said flange to prevent relative movement therebetween substantially in the direction of reciprocation of the platen, the outer cylindrical means being rigidly secured in said bores and the inner cylindrical means slidably engaging said columns, each of said cylindrical means having diametrically opposed pairs of mating surfaces extending longitudinally thereof for permitting reciprocation therebetween in directions substantially perpendicular to the reciprocation of the platen, said mating surfaces being disposed in planes substantially parallel to and equidistant from planes passing through the axes of said columns and intersecting in a central line of the platen to accurately and automatically compensate for the resultant thermal expansion and contraction thereof occurring along said intersecting planes relative to said columns.

12. In a press, a thermally expansible and contractible, reciprocable platen having a plurality of peripherally spaced bores extending therethrough substantially in the direction of reciprocation thereof, a plurality of cylindrical columns extending through said bores, and guides interposed between said columns and platen, said guides comprising substantially cylindrical and concentrically spaced, inner and outer means, one of said cylindrical means having at least one radially extending, peripheral flange intermediate each end, and the other of said cylindrical means having at least two radially extending surfaces slidably engageable with said flange to prevent relative movement therebetween substantially in the direction of reciprocation of the platen, the outer cylindrical means being rigidly secured in said bores and the inner cylindrical means slidably engaging said columns, each of said cylindrical means having diametrically opposed pairs of mating surfaces extending longitudinally thereof for permitting relative reciprocation therebetween in directions substantially perpendicular to the reciprocation of the platen, said mating surfaces being disposed in planes substantially parallel to and equidistant from planes passing through the axes of said columns and intersecting in a central line of the platen to accurately and automatically compensate for the resultant thermal expansion and contraction thereof occurring along said intersecting planes relative to said columns.

References Cited in the file of this patent

UNITED STATES PATENTS

| | | |
|---|---|---|
| 1,507,325 | Reynolds | Sept. 2, 1924 |
| 2,148,855 | Cannon | Feb. 28, 1939 |